United States Patent

Stepniak

[11] Patent Number: 5,919,107
[45] Date of Patent: *Jul. 6, 1999

[54] BELT TENSIONER FOR MOTOR VEHICLE

[75] Inventor: Jacek Stepniak, Stroud, Canada

[73] Assignee: Litens Automotive Partnership, Woodbridge, Canada

[21] Appl. No.: 08/914,895

[22] Filed: Aug. 20, 1997

Related U.S. Application Data

[XX .
[60] Provisional application No. 60/024,276, Aug. 21, 1996.

[51] Int. Cl.⁶ ........................................................ F16H 7/10
[52] U.S. Cl. ........................... 474/112; 474/135; 474/133; 474/117
[58] Field of Search ................................... 474/112, 133, 474/135, 101, 138, 109, 110

[56] References Cited

U.S. PATENT DOCUMENTS

| | | |
|---|---|---|
| 4,473,362 | 9/1984 | Thomey et al. . |
| 4,504,254 | 3/1985 | Foster .................................. 474/135 X |
| 4,571,222 | 2/1986 | Brandenstein et al. . |
| 4,618,335 | 10/1986 | Brandenstein et al. . |
| 4,838,839 | 6/1989 | Watanabe et al. ....................... 474/135 |
| 4,889,520 | 12/1989 | Brandenstein et al. . |
| 4,917,655 | 4/1990 | Martin ..................................... 274/135 |
| 4,934,987 | 6/1990 | Kadota et al. . |
| 5,244,438 | 9/1993 | Golovatai-Schmidt . |
| 5,256,112 | 10/1993 | Thomey et al. . |
| 5,334,110 | 8/1994 | Gardner et al. ........................ 474/135 |
| 5,391,119 | 2/1995 | Kondo et al. . |
| 5,470,279 | 11/1995 | Brandenstein et al. . |

FOREIGN PATENT DOCUMENTS

| | | |
|---|---|---|
| 42 23 324 | 1/1994 | Germany . |
| 44 39 834 | 6/1995 | Germany . |
| 1-150057 | 6/1989 | Japan . |
| 2 233 063 | 1/1991 | United Kingdom . |
| 2 249 152 | 4/1992 | United Kingdom . |
| WO 93/20368 | 3/1993 | WIPO . |

*Primary Examiner*—John A. Jeffery
*Assistant Examiner*—Marcus Charles
*Attorney, Agent, or Firm*—Pillsbury Madison & Sutro LLP

[57] ABSTRACT

A belt tensioner for tensioning a drive belt or timing belt comprises an eccentric adjusting member having an end surface thereof constructed and arranged to be mounted directly in surface-to-surface engagement with respect to a belt tensioner mounting surface for an engine frame. A pivoted structure is mounted on the eccentric adjusting member for pivoted movement between a first position and a second position, and a belt tensioning pulley is mounted for rotational movement on the pivoted structure. A coil torsion spring is constructed and arranged to resiliently bias the pivoted structure in a belt tightening direction away from the first position and toward the second position, the eccentric adjusting member being movable during an installation procedure to move the pivoted structure against the bias of the coil torsion spring into a position wherein the belt tensioning pulley is disposed in predetermined static tensioning relation with the belt, at which point the eccentric adjusting member is to be manually fixed. The end surface of the eccentric adjusting member is in sliding surface-to-surface relation with the mounting surface during rotation of the eccentric adjusting member.

16 Claims, 5 Drawing Sheets

BELT TENSIONER FOR MOTOR VEHICLE

This application is a provision of Ser. No. 60/024,276 filed Aug. 21, 1996.

BACKGROUND OF THE INVENTION

The present invention relates to belt tensioners, and in particular, belt tensioners which can be easily and precisely installed in operative relation with a timing or drive belt.

Belt tensioners, are, of course, well known devices that have been utilized in many belt systems heretofore. It is conventional practice in the belt tensioner art to provide for the application of a constant belt tensioning force which compensates for increases in belt length due to wear and other factors. A common type of conventional belt tensioner embodies a fixed structure and a pivoted structure pivotally mounted on the fixed structure by a pivot assembly. The pivoted structure carries a belt-engaging pulley. A coil spring is mounted in surrounding relation to the pivot assembly and has its ends connected between the fixed and pivoted structures so as to bias the latter toward a position of maximum belt take-up so that the spring biasing force decreases as the pivoted structure moves from a position of minimum take up to a position of maximum belt take-up. Despite this varying spring force within the range of movement provided, a substantially constant belt tension is maintained. The principles stated above can be appreciated from U.S. Pat. No. 4,473,362.

It is also known that when belt tensioners are installed on the engine, they should be installed so as to apply a predetermined static tensioning force to the belt. In addition, the pivoted structure which conventionally carries the pulley is movable between two positions defined by end stops. During the adjustment or installation of the tensioner, an adjusting eccentric member forming part of the fixed structure is adjusted to move the pivoted structure into a position between the stops, wherein the belt tensioning pulley is disposed in a predetermined static tensioning relation to the belt. Such arrangements are proposed in U.S. Pat. No. 5,244,438, and UK Patent No. 2,249,152.

A shortcoming in the designs of these two patents is that they both disclose tensioners that have a base plate on which the adjusting eccentric member is mounted. In this construction, wherein a base plate forms part of the tensioner and is used to mount the eccentric adjusting member onto a mounting surface for the engine frame, it is difficult to make certain that the eccentric adjusting member establishes a pivotal axis which is perpendicular to the engine frame with the desired degree of preciseness. This perpendicularity is desirable so that the tensioning pulley is not tilted, and so that the belt is axially balanced on the pulley.

It is an object of the present invention to provide a belt tensioner which has an eccentric adjusting member which is mounted directly onto the mounting surface provided for the engine, without a tensioner base plate therebetween.

In achieving this object, the present invention provides a belt tensioner for tensioning a drive belt or timing belt comprises an eccentric adjusting member having an end surface thereof constructed and arranged to be mounted directly in surface-to-surface engagement with respect to a belt tensioner mounting surface provided by an engine frame. A pivoted structure is mounted on the eccentric adjusting member for pivoted movement between a first position and a second position, and a belt tensioning pulley is mounted for rotational movement on the pivoted structure. A coil torsion spring is constructed and arranged to resiliently bias the pivoted structure in a belt tightening direction away from the first position and toward the second position, the eccentric adjusting member being movable during an installation procedure to move the pivoted structure against the bias of the coil torsion spring into a position wherein the belt tensioning pulley is disposed in predetermined static tensioning relation with the belt, at which point the eccentric adjusting member is to be manually fixed. The end surface of the eccentric adjusting member is in sliding surface-to-surface relation with the mounting surface during rotation of the eccentric adjusting member.

Furthermore, conventional tensioners provides a stop member which limits the amount of travel of the pivoted structure between the first and second positions. These stop members have heretofore been substantially rigid, so as to provide a significant amount of shock or impact to the pivoted structure when the stop is hit with a large force. It is an object of the present invention to provide a more resilient stop member to reduce severity of impact received by the pivoted structure upon reaching the first or second stop positions, without increasing the cost of the tensioner. To accomplish this, the coil torsion spring used to bias the pivoted structure in a belt-tightening direction towards the second position has an extending portion thereof used as a stop member.

In particular, the present invention achieves the above object by providing a belt tensioner for tensioning a drive belt or timing belt comprising an eccentric adjusting member constructed and arranged to be mounted on a mounting surface for an engine frame, and a pivoted structure mounted on the adjusting member for pivoted movement between a first position and a second position. The pivoted structure has first and second stop surfaces providing limits to the movement thereof. A belt tensioning pulley is mounted for rotational movement on the pivoted structure, and a coil torsion spring has one end thereof operatively connected with the pivoted structure and is constructed and arranged to resiliently bias the pivoted structure in a belt tightening direction away from the first position and toward the second position, the torsion spring having a radially outwardly extending second end. The eccentric adjusting member is adjustable during an installation procedure to move the pivoted structure against the bias of the coil torsion spring into a position wherein the belt tensioning pulley is disposed in predetermined static tensioning relation with the belt, at which point the eccentric adjusting member is to be manually fixed. During operation of the tensioner, movement of the pivoted structure in a direction toward the first position is terminated at the first position by engagement of the first stop surface with the radially outwardly extending second end of the coil torsion spring, and movement of the pivoted structure in a direction toward the second position is terminated at the second position by engagement of the second stop surface with the radially outwardly extending second end of the coil torsion spring.

Furthermore, during the installation procedure, the precise positioning of the pivoted structure relative to the stop surfaces is more critical than the positioning of the pivoted structure for purposes of placing the pulley in predetermined static tensioning relation with the belt, as the latter permits a greater margin of error. Thus, it is an object of the present invention to provide a belt tensioner wherein the position of the pivoted structure relative to the stop surfaces is fixed during the installation procedure in which the pulley is moved into predetermined static tensioning relation with the belt. After the predetermined tensioning relation of the pulley with the belt is established, the pivoted structure is released to permit relative movement thereof towards and away from the stop surfaces.

In particular, the above object is achieved by providing a belt tensioner for tensioning a drive belt or timing belt comprising an eccentric adjusting member constructed and arranged to be mounted on a mounting surface for an engine frame, and a pivoted structure mounted on the adjusting member for pivoted movement between a first position and a second position, the pivoted structure having first and second stop surfaces. A belt tensioning pulley is mounted for rotational movement on the pivoted structure, and a coil torsion spring is constructed and arranged to resiliently bias the pivoted structure in a belt tightening direction away from the first position and toward the second position. The eccentric adjusting member is adjustable during installation of the belt tensioner to move the pivoted structure against the bias of the coil torsion spring into a position wherein the belt tensioning pulley is disposed in predetermined static tensioning relation with the belt, the pivoted structure having an indicator being movable into a position indicating that the pulley is in the predetermined static tensioning engagement with the belt during the installation. A base plate provides first and second stop surfaces, the base plate being temporarily attached to the pivoted structure for movement therewith during the installation such that the first stop surface of the pivoted structure is disposed a fixed predetermined distance from the first stop surface of the base plate and the second stop surface of the pivoted structure is disposed a fixed predetermined distance from the second stop surface of the base plate during concurrent rotation of the pivoted structure and the base plate during the installation of the tensioner. The eccentric adjusting member and the base plate are constructed and arranged to be manually fixed from further movement after the belt tensioning pulley is moved into the predetermined static tensioning relation with the belt, and the tensioner is rendered operative after the base plate is fixed from further movement by unattaching the pivoted structure from the base plate to enable pivotal movement of the pivoted structure with respect to the eccentric adjusting member.

As a further object of the present invention, a spring extension from the coil torsion spring which biases the pivoted structure in the belt tightening direction is used as an indicator for indicating the appropriate installation of the tensioner.

In particular, the present invention provides a belt tensioner for tensioning a drive belt or timing belt comprising an eccentric adjusting member constructed and arranged to be mounted on a mounting surface for an engine frame. A pivoted structure is mounted on the adjusting member for pivoted movement between a first position and a second position, the pivoted structure having an indicator for indicating a relative position of the pivoted structure with respect to the first and second positions. A belt tensioning pulley is mounted for rotational movement on the pivoted structure. A coil torsion spring has one end thereof operatively connected with the pivoted structure and is constructed and arranged to resiliently bias the pivoted structure in a belt tightening direction away from the first position and toward the second position, the coil torsion spring having a radially outwardly extending second end. The eccentric adjusting member is adjustable during an installation procedure to move the pivoted structure into a position wherein the belt tensioning pulley is disposed in predetermined static tensioning relation with the belt. The pivoted structure is movable relative to the eccentric adjusting member and against the bias of the coil torsion spring during adjustment of the eccentric adjusting member so that the indicator is moved into alignment with the radially outwardly extending second end of the coil spring, thus indicating that the pulley has been moved into the predetermined static tensioning relation with the belt and that the pivoted structure has been moved to a predetermined static position relative to the first and second positions, at which point the eccentric adjusting member is to be manually fixed.

Other objects and advantages of the present invention will be appreciated from the following detailed description of the drawings and the appended claims.

DETAILED DESCRIPTION OF THE PREFERRED EMBODIMENTS ILLUSTRATED IN THE DRAWINGS

Figure 1:
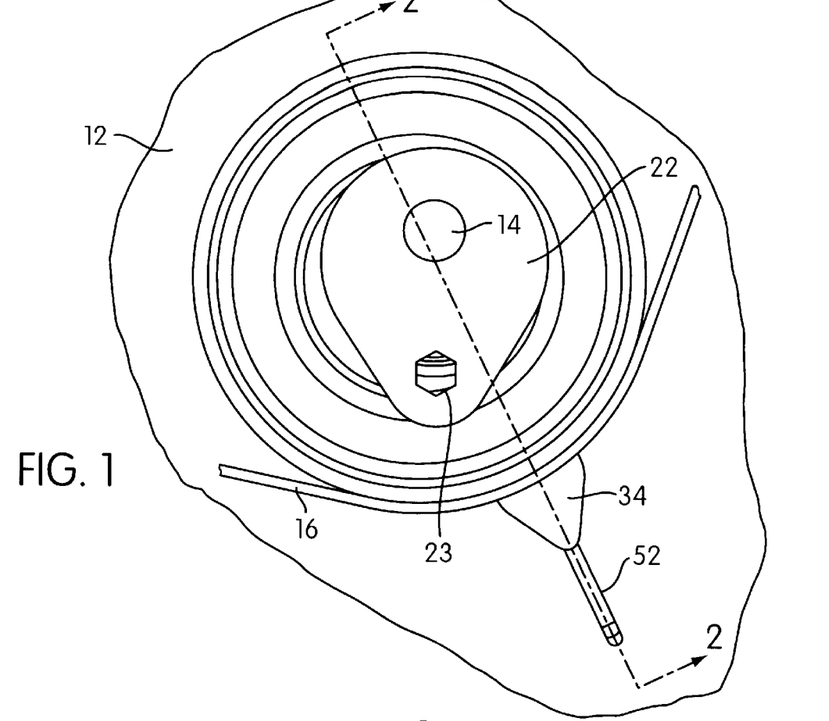
FIG. 1 is a front plan view of a belt tensioner in accordance with a first embodiment of the present invention.

Shown in FIG. 1 is a front plan view of a belt tensioner 10 in accordance with the present invention. The belt tensioner 10 is shown bolted on an engine block or frame, generally indicated at 12, by a threaded fixing bolt 14, and is in tensioning engagement with a drive or timing belt 16.

Figure 2:
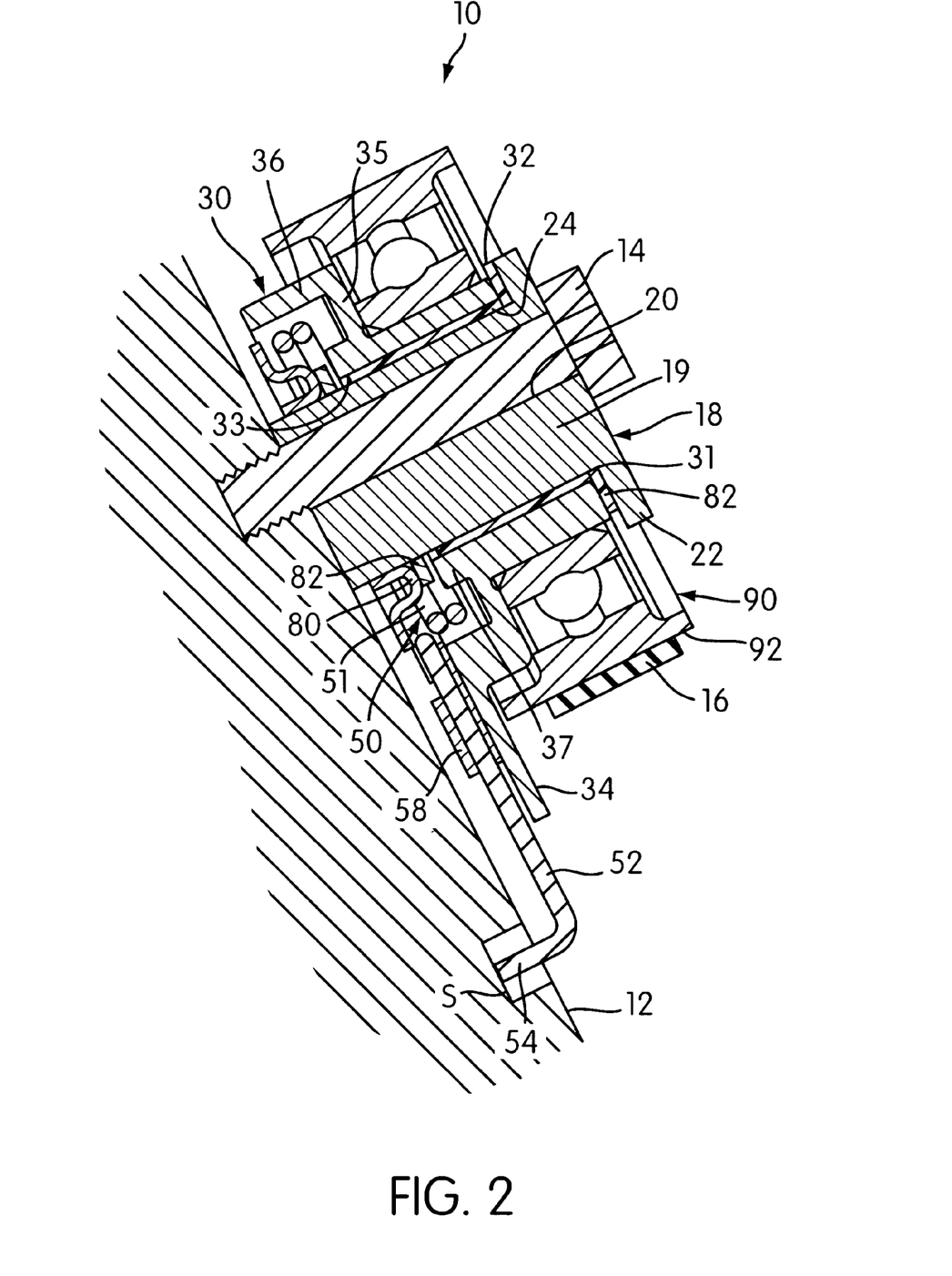
FIG. 2 is a cross-sectional view taken through the line 2—2 in FIG. 1 showing the belt tensioner in accordance with the first embodiment of the present invention.

FIG. 2 is a cross-sectional view taken through the line 2—2 in FIG. 1. As shown, the belt tensioner 10 includes an inner eccentric adjusting member 18. Adjusting member 18 has a main eccentric portion 19, and a cam-shaped radially outwardly projecting plate or flange 22. The flange 22 is preferably formed integrally with the eccentric portion 19 at a longitudinal end of the eccentric portion 19 that is to be positioned furthest from the engine block 12, but can also be formed as a separate structure which is subsequently fixed to the eccentric portion 19 in any known manner. The present invention contemplates that the eccentric adjusting member, and in particular the eccentric portion 19, may have any construction that provides the function is of maintaining the arm (to be described) in eccentric relation to the fixing bolt 14. For example, the eccentric portion 19 may be provided with a substantially U-shaped transverse cross-sectional configuration having a thickened bight portion and a surrounding cylindrical sleeve for supporting a bearing. For simplicity, however, the present invention is described and illustrated with an eccentric portion 19 having a cylindrical block construction, with a longitudinal bore 20 extending therethrough at position axially displaced from the central longitudinal axis of the cylindrical configuration. The bore 20 receives fixing bolt 14, which secures the adjusting member 18 to the engine block 12.

It can be seen in FIG. 1 that the end surface of the adjusting member 18 is disposed in surface-to-surface engagement with a mounting surface provided on the engine block. This mounting surface can be provided by the engine block itself, or by a bracket or the like fixed to the engine block. This holds true for each of the embodiments disclosed herein.

Flange 22 is provided with a hexagonal opening 23 (see FIG. 1) therethrough adapted to cooperate with an adjusting tool in an installation operation wherein the belt 16 is trained about the belt tensioner 10, and wherein the belt tensioner 10 is adjusted and set to apply the appropriate tensioning force on the belt, as will be described later in greater detail.

Disposed in engagement with the cylindrical exterior surface of the main cylindrical eccentric portion 19 of the eccentric adjusting member 18, adjacent the flange 22, is a sleeve bearing 24, preferably made from PTFE, or the like.

A working eccentric or lever arm 30 constitutes a pivoted structure having a main eccentric portion 32 annually disposed in engagement about the sleeve bearing 24. The eccentric portion 32 has a cylindrical exterior surface and a longitudinal bore 31 extending therethrough defined by an interior surface 33. The bore 31 is axially displaced relative to the central longitudinal axis of the cylindrical outer configuration of the eccentric portion 32, so that the arm or pivoted structure 30 is eccentrically disposed relative to the bolt 14, adjusting member 18, and bearing 24. The interior surface 33 of the adjusting member 18 slidably engages the exterior surface of sleeve bearing 24.

Extending radially outwardly from between the longitudinal ends of the eccentric portion 32, generally closer to the end adjacent the engine block 12 is an annular wall portion 35. An outer cylindrical wall portion 36 extends from an outer periphery of the annular wall portion 35 towards the engine block 12, in generally concentric relation to an end portion 37 of the eccentric portion 32 closest to the engine block 12. As can be appreciated from the longitudinal sectional view of FIG. 2, a radially projecting pointer 34 extends a relatively thicker portion of the cylindrical wall portion 36. The pointer 34 is used in installation of the belt tensioner 10 to make certain that the tensioner engages the belt 16 with a predetermined amount of static belt load force during the initial set-up.

Figure 3:
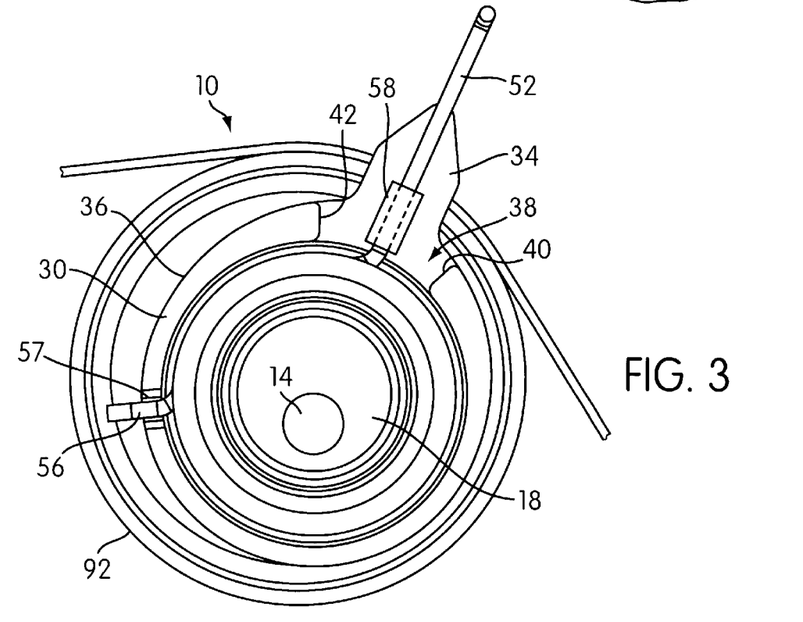
FIG. 3 is a rear plan view of the belt tensioner in accordance with the first embodiment of the present invention.

A torsion spring 50 is connected between the engine block 12 and the arm 30. More particularly, the spring 50 has a main portion 51 coiled freely about the eccentric adjusting member 18 and eccentric cylindrical portion 32 of the arm 30. One end of the torsion spring 50 closest to the engine block 12 has a spring extension portion 52 extending radially outwardly from the main portion 51. The spring extension portion 52 terminates in a connecting portion 54 which is bent towards the engine block and received within a longitudinal or elongate slot S in the engine block 12. The interengagement between the connecting portion 54 of spring 50 and slot S permits shifting movement of the spring 50 during the initial installation, but prevents rotation of the end 52 of the spring (and entire tensioner) during installation or operation of the tensioner. In an alternate arrangement, a pin projects outwardly from the engine block 12, and the bent connecting portion 54 is omitted. The side surface of spring extension portion 52 engages the pin. This enables the spring and tensioner to shift during installation and provides a rest surface against which the extension end 52 is biased during installation and operation. The other end of the torsion spring 50 extends radially outwardly from the main portion 51 so as to form a connecting portion 56, as seen in FIG. 3. The connecting portion 56 is connected with the arm 30 by being received within a slot 57 formed in the outer cylindrical wall portion 36 of the arm 30.

As shown most clearly in FIG. 3, an opening 38 is formed in the outer cylindrical wall portion 36 of the arm 30. The opening 38 permits the spring extension portion 52 to extend radially outwardly beyond the radial extent of the outer cylindrical wall portion 36 for connection with the engine block 12. The edges defining the opening 38 in the outer cylindrical wall portion 36 function as limiting stops 40, 42, which limit the rotational position of the arm 30. More particularly, during operation of the tensioner 10, the arm 30 is permitted to rotatably oscillate about the sleeve bearing 24. The rotational position of the arm 30 is limited by engagement of the stops 40 and 42 with the spring extension portion 52. Preferably, the spring extension portion 52 is provided with a surrounding elastomeric sleeve 58, which acts as a quieting bumper and adds structural support to the extension portion 52.

Annularly disposed about the adjusting member 18, adjacent the engine block 12, is a spring bearing ring 80 welded or otherwise fixed to the adjusting member. The spring bearing ring 80 has a substantially flat annular periphery that provides an inner bearing surface and a containment for the tension spring 50. Disposed at both longitudinal ends of the cylindrical eccentric wall portion 32 are a pair of bearing washers 82 and 84. The bearing ring 80 has a arcuate annular portion which is disposed radially inwardly from the aforementioned flat portion. A convex surface of the annular inner portion serves as a support surface for the bearing washer 82. The bearing washer 82 constitutes a low-friction bearing member between the bearing ring 80 and the end 37 of the eccentric cylindrical portion 32, and the bearing washer 84 constitutes a low-friction bearing member between an opposite end of eccentric cylindrical portion 32 and flange 22.

A belt-engaging pulley 90 is annularly disposed about the arm 30 in conventional fashion. In the preferred embodiment, the pulley is mounted on ball bearings 91. The ball bearings 91 are mounted between an outer bearing race provided by the annular interior surface of pulley 90 and an inner bearing race 93 fixed to the exterior cylindrical surface of the cylindrical eccentric portion 32 of the arm 30. The pulley 90 provides an exterior annular surface 92, which is preferably smooth to engage the preferably flat exterior surface of the poly-V or timing belt 16.

Installation and operation of the belt tensioner 10 will now be described. Initially, the connecting portion 54 of the tension spring 50 is loosely received within the slot S in the engine block 12, and the fixing bolt 14 is loosely fitted into a threaded opening within the engine block 12. Because the fixing bolt 14 is not initially tightened, the adjusting member 18 is permitted to rotate in eccentric fashion about the fixing bolt 14 by use of an appropriate installation adjusting tool which engages within the hexagonal opening 23. The adjusting member 18 is rotated so that its eccentric configuration causes the belt engaging surface 92 of the pulley 90 to be moved away from the belt engaging position so that the belt 16 can be positioned around the belt engaging surface 92 of the pulley 90. During this initial rotation of the adjusting member 18 as aforementioned, the resultant slight movement or shifting of the spring 50 causes the connecting portion 54 of spring 50 to slide within the slot S. In addition, during the aforementioned initial rotation of the adjusting member 18, the rotational position of arm 30 remains substantially stationary, as there is insufficient belt load torque transmitted by the belt through the arm 30 to overcome the opposing spring torque of torsion spring 50.

After the belt 16 is positioned around the tensioner 10, the adjusting member 18 is then rotated further (or in an opposite direction) so as to bring the surface 92 of the pulley 90 into tensioning engagement with the belt 16. When sufficient tension is applied to the belt 16, the opposing belt load torque applied by belt 16 through the arm 30 is sufficient to overcome the spring torque applied by the torsion spring 50. This will cause arm 30 to rotate in conjunction with the adjusting member 18 against the biasing force of the torsion spring 50. Prior to the arm 30 beginning to rotate, the stop 42 of the arm 30 rests in resiliently biased engagement with the elastomeric spring sleeve 58 of the spring extension 52. As the arm 30 begins to rotate, the stop 42 is moved away from the spring sleeve 58, and the pointer 34 is brought into alignment with the spring extension 52. At this rotational or angular position of arm 30, the tension spring 50 is adjusted such that the predetermined desired static tensioning force is applied against the belt 16. At this point, the mounting bolt 14 is tightened to fix the adjusting member 18 in place. The tensioner 10 has thus been installed with the arm 30 free to rotate about the adjusting member 18, but being limited in its rotation by the stops 40 and 42. When the belt 16 is slackened during operation of the engine, the tension spring 50 rotates the arm 30 so that the stop 42 approaches the spring extension 52, and so that the eccentric configuration of the cylindrical eccentric portion 32 of arm 30 causes the pulley 90 to be moved further towards the belt engaging direction to take-up the slack in the belt 16. In contrast, when the belt 16 is tensioned during operation of the engine, the belt 16 applies a load force that causes the arm to be rotated in an opposite direction so that the stop 40 approaches the spring extension 52, and the pulley is moved away from the belt engaging direction by the belt 16 against the force of the spring 50.

Figure 4:
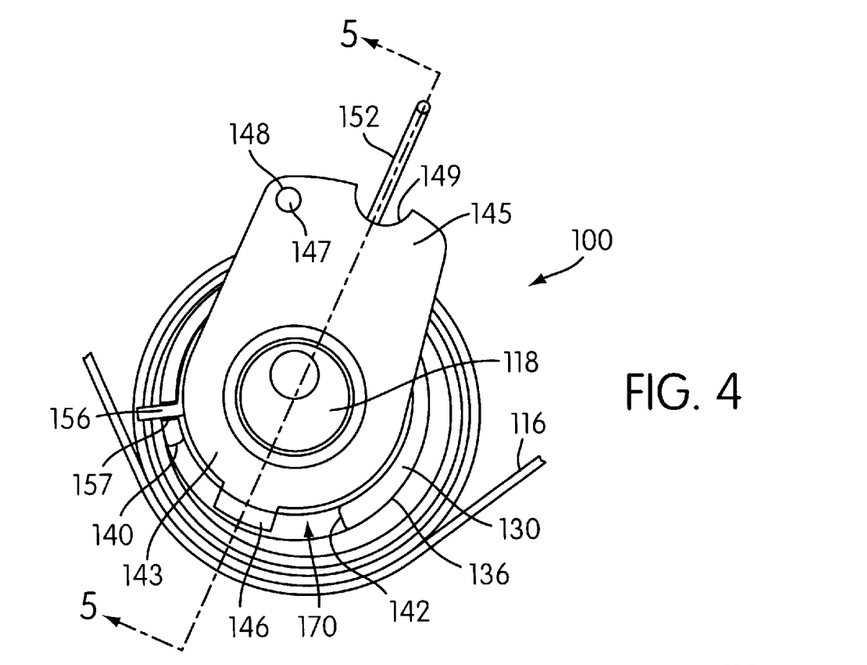
FIG. 4 is a rear plan view of the belt tensioner in accordance with a second embodiment of the present invention.
Figure 5:
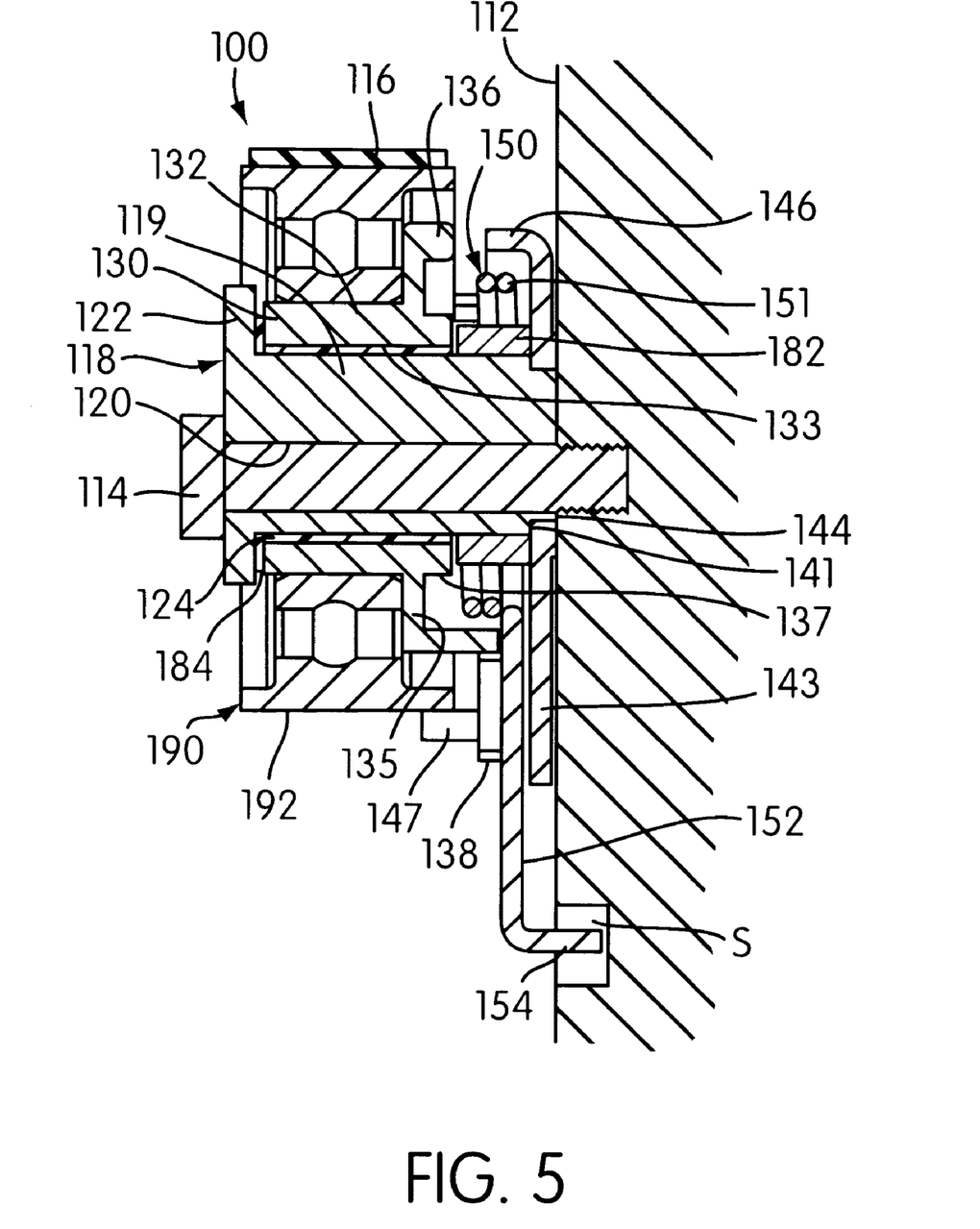
FIG. 5 is a cross-sectional view taken through the line 5—5 in FIG. 4 showing the belt tensioner in accordance with the second embodiment of the present invention.

Shown in FIG. 4 is a rear plan view of a belt tensioner 100 in accordance with a second embodiment of the present invention, and FIG. 5 is a cross-sectional view taken through the line 5—5 in FIG. 4. In FIG. 5, the belt tensioner 100 is shown mounted on an engine block 112 by a threaded fixing bolt 114, and in tensioning engagement with a drive or timing belt 116.

The belt tensioner 100 includes an inner eccentric adjusting member 118. Adjusting member 118 has a main cylindrical eccentric portion 119 and a longitudinal bore 120 extending therethrough at position axially displaced from the central longitudinal axis of the cylindrical eccentric portion. The bore 120 receives fixing bolt 114, which secures the adjusting member 118 to the engine block 112.

Adjusting member 118 has a cam-shaped, radially outwardly projecting flange 122 formed integrally with the cylindrical portion 119 at a longitudinal end thereof that is to be positioned furthest from the engine block 112. Flange 122 is provided with a hexagonal opening 123 (see FIG. 6) therethrough adapted to cooperate with an adjusting tool in an installation operation wherein the belt 116 is trained about the belt tensioner 100, and wherein the belt tensioner 100 is adjusted and set to apply the appropriate tensioning force on the belt 116, as will be described later in greater detail.

As shown in FIG. 5, disposed in engagement with the exterior cylindrical surface of the main cylindrical portion 119 of the eccentric adjusting member 118, adjacent the flange 122, is a sleeve bearing 124 preferably made from PTFE, or similar anti-friction material.

A working eccentric or lever arm 130 has a main eccentric portion 132 annularly disposed in engagement about the sleeve bearing 124. The arm 130 has a cylindrical exterior surface and a longitudinal bore 131 extending therethrough defined by an interior surface 133. The bore 131 is axially displaced from the central longitudinal axis of the cylindrical eccentric portion 132 so that that the arm 130 is eccentrically disposed relative to the bolt 114, adjusting member 118, and bearing 124. The interior surface 133 of the eccentric portion 132 slidably engages the exterior surface of sleeve bearing 124 to permit rotation of the arm 130 about the bolt 114, adjusting member 118 and bearing 124.

Extending radially outwardly from the exterior of cylindrical eccentric portion 132 is an annular wall portion 135. The wall portion 135 is disposed between the opposite longitudinal ends of the cylindrical eccentric portion 132, generally closer to the end adjacent the engine block 112. An outer cylindrical wall portion 136 extends from an outer periphery of the annular wall portion 135 towards the engine block 112, in generally concentric relation to relation to an end portion 137 of the cylindrical eccentric portion 132 closest to the engine block 112.

A torsion spring 150 is connected between the engine block 112 and the arm 130. More particularly, the spring 150 has a main portion 151 coiled freely about the eccentric adjusting member 118, generally at a portion of the adjusting member 118 to be positioned closest to the engine block 112. The end of the torsion spring 150 closest to the engine block 112 has a spring extension portion 152 extending radially outwardly from the main portion 151. The spring extension portion 152 terminates in a connecting portion 154, which is bent towards the engine block and received within a longitudinal slot S in the engine block 112. The other end of the torsion spring 150 extends radially outwardly from the main portion 151 so as to form a connecting portion 156, as seen in FIG. 4. The connecting portion 156 is connected with the arm 130 by being received within a slot 157 formed in the outer cylindrical wall portion 136 of the arm 130.

A pulley 190 is annularly disposed about the arm 130 in conventional fashion. Preferably, the pulley 90 is mounted on ball bearings 91 and inner bearing race 93. The pulley 190 provides an exterior annular surface 192, which is constructed and arranged to engage the belt 116.

A radially outwardly projecting portion 138 of the arm 130 extends radially outwardly from the cylindrical outer wall portion 136. The projecting portion 138 is provided with a hole or opening 139 therethrough, as seen best in FIG. 6.

Returning now to FIG. 5, it can be seen that a coined base plate 143 is positioned against the engine block 112 and has a circular opening 144 for receiving the end of the adjusting member 118. The surface on the base plate 143 facing away from the engine block 112 and surrounding the opening 144 is engaged by an annular shoulder 141 or surface provided around the periphery of the adjusting eccentric 118 at the end of the adjusting eccentric 118. The thickness of the base plate 143 is slightly greater than the axial distance between the engine block 112 and the surface 141 so that the end of the adjusting member 118 is held in slightly spaced relation from the engine block 118, at least prior to tightening of the fixing bolt 114.

Figure 6:
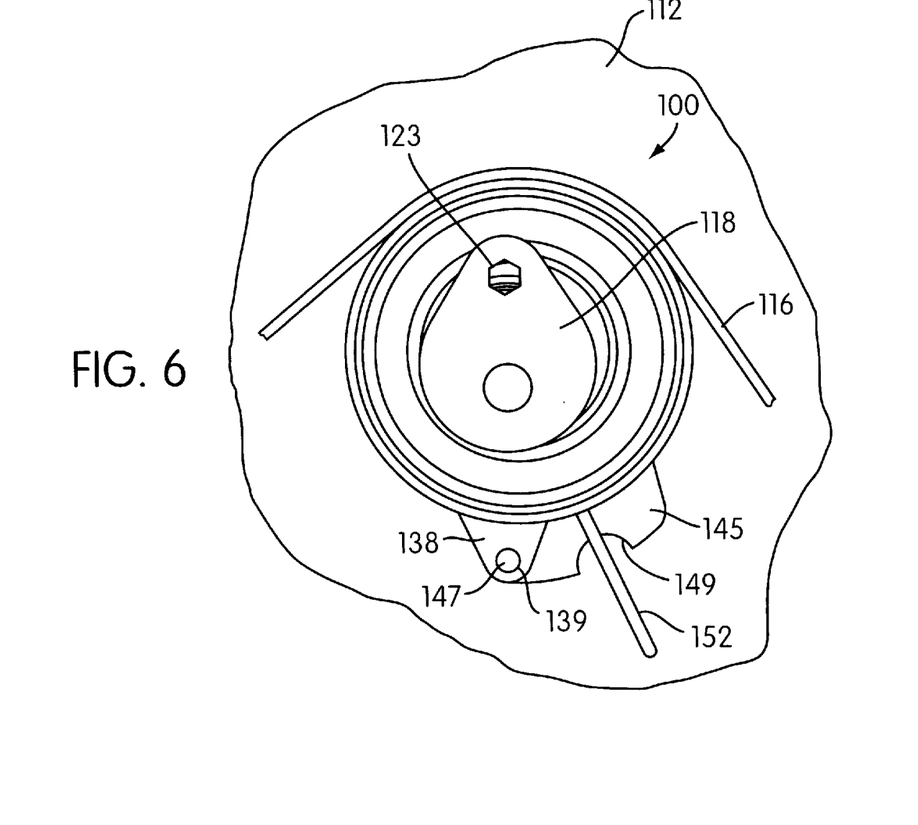
FIG. 6 is a front plan view of the belt tensioner in accordance with the second embodiment of the present invention.

The base plate 143 has a radially outwardly projecting extension portion 145, which, together with the projection 138 and the spring extension portion 152, extends radially outwardly beyond the outer radial surface 192 of the pulley 190, so that these three portions can be clearly seen when the tensioner is installed on the engine block 112, as can be appreciated from FIG. 6. The extension portion 145 of base plate 143 also has a hole or opening 148 therethrough, and an alignment notch 149 provided along the exterior periphery thereof. The functions of hole 148 and notch 149 are described later.

The base plate 143 further includes a bent tab portion 146, which extends axially in a direction away from the engine block 112, as shown. The bent tab portion 146 functions as a stop member, which remains fixed during operation of the tensioner and cooperates with stops 140 and 142 of the arm 130 to limit the angular or rotational position of the arm 130. The stops 140 and 142 are simply opposing edges formed on opposite sides of an opening 170 formed in the cylindrical outer wall portion 136 of arm 130, as seen most clearly in FIG. 4. The tab portion or stop member 146 of the base plate is constructed and arranged to engage the stops 140 and 142 upon rotation of the arm beyond a predetermined angular range to limit the possible extent of pivotal movement of the arm 130 about the eccentric adjusting member 118.

Disposed at the opposite longitudinal ends of the cylindrical eccentric wall portion 132 are a pair of low-friction annular bearing washers 182 and 184. Bearing washer 182 is disposed generally within the confines of the main spring portion 151 and constitutes a bearing member between the base plate 143 and the end 137 of the cylindrical eccentric portion 132. Bearing washer 184, on the other hand, constitutes a bearing member between an opposite end of cylindrical eccentric portion 132 and flange 122.

Prior to installation of the tensioner 100, a removable pin 147 is constructed and arranged to extend through the hole 139 in the projection 138 and further to extend into the hole 148 in the base plate 143 so as to couple the base plate 143 with the arm 130 to prevent relative rotational movement therebetween. In the initial configuration of the tensioner assembly 100, prior to installation, the spring extension portion 152 resiliently engages the side surface of the pin 147, while the opposite end of the spring is connected to the arm 130 via spring connection 156. The torsional action of the torsion spring 150 prior to installation causes the stop 142 of the arm 130 to be resiliently engaged with the edge of stop member 146.

The installation of the belt tensioner assembly 100 in accordance with the second embodiment will now be described. As an initial step in the installation process, the bent end 154 of the spring extension 152 is received within slot S in the engine block 112. In addition, the mounting bolt 114 is inserted through the central bore of the adjusting member 118 and loosely secured to the threaded opening in the engine block 112 in such fashion that permits rotation of the adjusting member 118.

An installation adjusting tool is then inserted in hexagonal opening 123 in the adjusting member 118. The adjusting tool is used to manually rotate adjusting member 118, so that the outermost surface 192 of the pulley 190 is moved away from the belt engaging position to enable the belt to be looped around the pulley 190. During this rotation of adjusting member 118, the arm 130 remains fixed, as the belt load torque applied by the belt 116 through the arm 130 is insufficient to overcome the spring torque of torsion spring 150, which torsionally couples the arm 130 to the engine block 112. Continued rotation of the adjusting member 118 causes the outer surface 192 of the pulley 190 to be moved into tensioning engagement with the belt 116. Further pivotal movement of the adjusting member 118 causes the increased belt load force applied by the belt 116 to provide sufficient torque through the arm 130 to overcome the spring torque of spring 150 and thus cause the arm 130 to rotate against the bias of the spring 150 with the adjusting member 118. As the arm 130 is rotated against the biasing force of spring 150, the spring becomes more tightly wound as a result of the relative circumferential movement between the ends 154 and 156 during rotation of the adjusting member 118. More particularly, the end 154 of spring 150 remains rotationally fixed within slot S of engine block 112, while end 156 rotates in conjunction with the arm 130 to which it is fixed, thus further tightening the spring coils and increasing the spring force it applies to the arm 130.

Because the arm 130 is coupled by pin 147 to the base plate 143, the base plate 143 rotates with the arm 130. As a result, the position of the stop member 146 of the base plate 143 is fixed with respect to the stops 140 and 142, and there is no possibility of the stop member 146 being displaced from its desired orientation with respect to stops 140, 142 during the installation process.

Rotation of the arm 130 and base plate 143 causes the pin 147 to move away from the spring extension 152. Eventually, notch 149 is rotated into general alignment with the spring extension 152, at which point the torsion spring 150 is coiled to apply its desired spring load force. The mounting bolt 114 is then tightened to prevent further movement of the adjusting member 118. Axial compression of the base plate 143 between the adjusting member 118 and the engine block 112 as a result of such tightening causes the base plate 143 to likewise become fixed in place. Subsequent to tightening the mounting bolt 114, the pin 147 is removed from the holes 139 and 148. This enables the arm 130 to rotate relative to the base plate 143 and the adjusting member 118. The tensioner has now been installed with the appropriate tension in the torsion spring 150 to apply the appropriate spring torque to the arm 130, and with the stop member 146 in the desired position relative to stops 140, 142 of the arm 130. Because the stop member is pre-fixed relative to the stops 140, 142, it can be appreciated that the installation adjustment is made primarily to set the proper static tensioning force on the belt 116, and not to set the position of the stops. This is in contrast with the first embodiment, wherein the installation adjustment sets both parameters. Because the adjustment of the stops in the first embodiment generally must be made with a higher degree of accuracy than the tensioning adjustment, a less precise alignment between the spring extension 152 and notch 149 is required in the second embodiment. More particularly, the adjustment in the second embodiment need only be made such that the spring extension 152 is located somewhere between the ends of the relatively wide notch 149.

Figure 7:
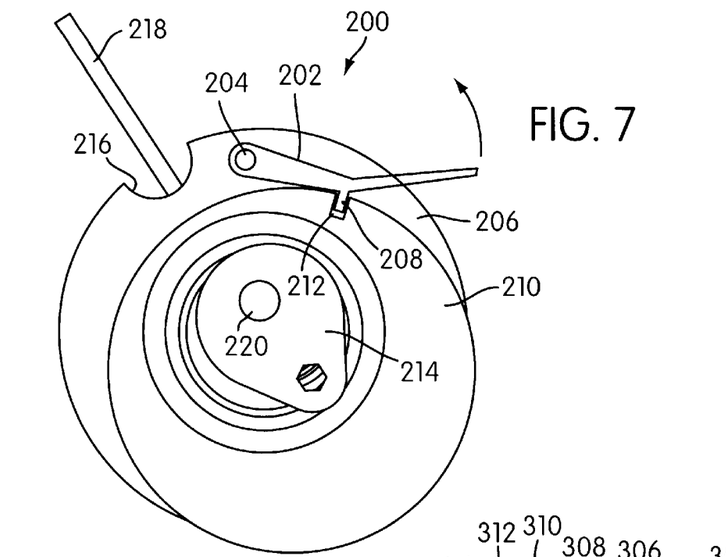
FIG. 7 is a front plan view of a modification of the belt tensioner in accordance with the second embodiment of the present invention.

FIG. 7 is a front plan view of a modification of the belt tensioner shown in FIGS. 4–6. The tensioner 200 shown in FIG. 7 functions identically to that shown in FIGS. 4–6, except rather than providing a separate pin member that couples the arm to the base plate by virtue of holes provided in the arm and base plate, a latch member is pivotally fixed to the base plate to accomplish the same function. Particularly, as shown in FIG. 7, the tensioner 200 includes a latch member 202 pivotally connected at one end 204 to the base plate 206. The latch member 202 has a projecting portion 208 at an intermediate portion thereof. The eccentric arm 210 has a slot 212 provided in a peripheral surface thereof. As shown, the slot 212 is constructed and arranged to receive the projecting portion 208, thereby rotationally coupling the arm 210 to the base plate 206. After the adjusting member 214 is rotated to align the notch 216 in the base plate with the spring extension portion 218, the fixing bolt 220 is tightened, as described with respect to FIGS. 4–6. After fixing belt 220 is tightened the latch member 202 is pivoted so that projecting portion 208 leaves the slot 212 so that the arm 210 is free to rotate.

Figure 8:
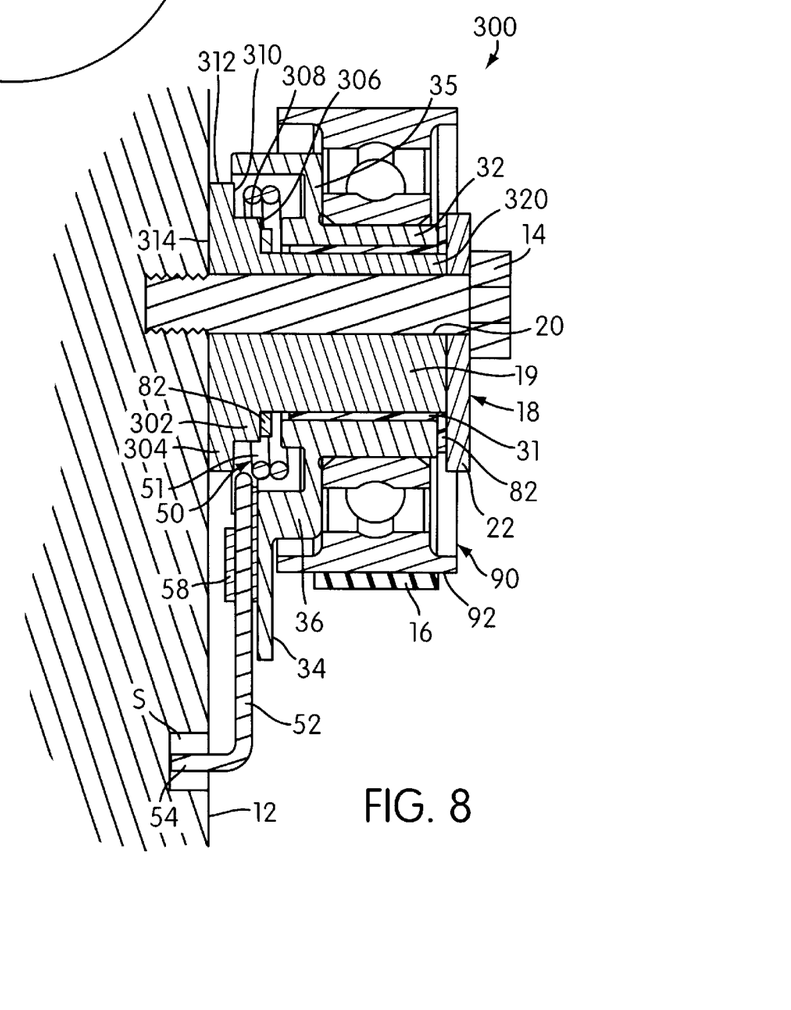
FIG. 8 is a cross-sectional view of a modification of the belt tensioner in accordance with the first embodiment of the present invention.

FIG. 8 is a cross-sectional view of a modification of the belt tensioner in accordance with the first embodiment of the present invention. The tensioner 300 in FIG. 8 is substantially identical to the tensioner shown in FIG. 1, except for the following differences. It should be noted that like elements in FIG. 1 and FIG. 8 are illustrated with the same reference numerals.

As shown in FIG. 8, the main difference between this modification and the first embodiment shown in FIG. 2 is with respect to the adjusting member 18. In the embodiment shown in FIG. 2, the flange 22 is formed integrally with the cylindrical portion 19 at a longitudinal end of the adjusting member that is positioned furtherest from the engine block. In the construction shown in FIG. 8, the flange 22 is formed separately from the main cylindrical portion 19 and then welded or otherwise fixed thereto. Furthermore, in the first embodiment shown in FIG. 2, the main cylindrical portion 19 has a substantially continuous cylindrical exterior surface throughout its extent, and a bearing ring 80 fixed to the exterior cylindrical surface of the main eccentric portion 19. In contrast, the embodiment shown in FIG. 8 does not include a bearing ring 80, but rather provides a pair of stepped flange portions 302 and 304 formed integrally with the main eccentric portion 19. In particular, the flange portion 302 includes a radially outwardly extending annular surface 306 extending radially outwardly from the exterior surface of main eccentric portion 19, and a cylindrical surface 308 pending axially from the surface 306 towards the engine block 12. The flange portion 304 is formed by a radially outwardly extending annular surface 310, which extends radially outwardly from the cylindrical surface 308, and a cylindrical surface 312, which extends axially towards the engine block from the annular surface 310. The cylindrical surface 312 terminates at the engine block, and defines the radial extent of the circular end surface 314 of the adjusting member 18 adjacent the engine block 12. The circular surface 314 is disposed in engagement with the surface of the engine block 12. The radially extending annular surface 306 serves as the support surface for the annular bearing washer 82. In addition, the flat annular surface 310 serves as a support and confinement service for the main portion 51 of the torsion spring 50. The flange portions 302 and 304 cooperate with the annular wall portion 35 and cylindrical wall portion 36 of arm 30 to substantially confine the main portion 51 of the spring 50 therebetween.

The flange portions 302 and 304 function to increase the radial extent of the eccentric portion 19 adjacent the engine block in order to assist the tensioner 300 is able to withstand higher belt load forces applied by the belt 16. More particularly, in the embodiment shown in FIG. 2, it can be appreciated that the load applied by the belt 16 applies a bending force to the bolt 14 through the tensioner 10. In the instance in which the bolt 14 is urged in a direction that is aligned with the thinner portion of the main eccentric portion 19, as is the case in FIG. 2, the bending force applied to the bolt may cause the thinner wall portion of the eccentric to become slightly deformed, especially at the portion thereof adjacent the engine block 12. In contrast, the thinner portion of the working eccentric 19 in the embodiment of FIG. 8, indicated by reference numeral 320, is supported at its end adjacent the engine block 12 by the radially outwardly extending flange portions 302 and 304. This will prevent any deformation of the thinner portion 320 as a result of the force applied by the belt 16.

It is preferred for the eccentric portion 19 in FIG. 2, as well as the eccentric portion and integrally formed flange portions 302 and 304 of the embodiment shown in FIG. 8, to be formed in a screw-machining operation. Any sufficiently rigid metal can be used, and most preferably, steel is used. Alternatively, a powdered metal, such as powdered aluminum or powdered steel can be used. It is preferred for the flange portion 22 in the embodiment shown in FIG. 8 to be made in a stamping operation, although this too can be made from a powdered metal or in a screw-machining operation.

It is known that a powdered metal construction is less expensive but weaker than screw-machined metal. When powdered metal is used, the powdered metal is poured into a die cavity together with a binder resin, and then punched to compact the material together in conventional fashion. It should be noted that powered metal is generally approximately 20% porous, and can be infiltrated by molten copper to be made stronger. The embodiment shown in FIG. 8 can be used to make a sufficiently strong, yet less-expensive adjusting member 18 in comparison with use of molten copper.

It should be noted that the above description and attached drawings of the subject invention are merely illustrative, and that the present invention contemplates all modifications and equivalents encompassed by the spirit and scope of the following claims.

I claim:

1. A belt tensioner for tensioning a drive belt or timing belt comprising:

an eccentric adjusting member constructed and arranged to be mounted on a mounting surface for an engine frame;

a pivoted structure mounted on said adjusting member for pivoted movement between a first position and a second position, said pivoted structure having first and second stop surfaces providing limits to said movement thereof;

a belt tensioning pulley mounted for rotational movement on said pivoted structure;

a coil torsion spring having one end thereof operatively connected with said pivoted structure and being constructed and arranged to resiliently bias said pivoted structure in a belt tightening direction away from said first position and toward said second position, said torsion spring having radially outwardly extending second end;

said eccentric adjusting member being adjustable during an installation procedure to move said pivoted structure against the bias of said coil torsion spring into a position wherein said belt tensioning pulley is disposed in predetermined static tensioning relation with said belt, at which point said eccentric adjusting member is to be manually fixed;

wherein during operation of said tensioner, movement of said pivoted structure in a direction toward said first position is terminated at said first position by engagement of said first stop surface with said radially outwardly extending second end of said coil torsion spring, and wherein movement of said pivoted structure in a direction toward said second position is terminated at said second position by engagement of said second stop surface with said radially outwardly extending second end of said coil torsion spring.

2. A belt tensioner according to claim 1, wherein said radially outwardly extending second end of said coil torsion spring has an elastomeric member which engages said first and second stop surfaces.

3. A belt tensioner for tensioning a drive belt or timing belt comprising:

an eccentric adjusting member constructed and arranged to be mounted on a mounting surface for an engine frame;

a pivoted structure mounted on said adjusting member for pivoted movement between a first position and a second position, said pivoted structure having first and second stop surfaces;

a belt tensioning pulley mounted for rotational movement on said pivoted structure;

a coil torsion spring constructed and arranged to resiliently bias said pivoted structure in a belt tightening direction away from said first position and toward said second position;

said eccentric adjusting member being adjustable during installation of said belt tensioner to move said pivoted structure against the bias of said coil torsion spring into a position wherein said belt tensioning pulley is disposed in predetermined static tensioning relation with said belt, said pivoted structure having an indicator being movable into a position indicating that the pulley is in said predetermined static tensioning engagement with said belt during said installation;

a base plate providing first and second stop surfaces, said base plate being temporarily attached to said pivoted structure for movement therewith during said installation such that said first stop surface of said pivoted structure is disposed a fixed predetermined distance from said first stop surface of said base plate and said second stop surface of said pivoted structure is disposed a fixed predetermined distance from said second stop surface of said base plate during concurrent rotation of said pivoted structure and said base plate during said installation of said tensioner;

said eccentric adjusting member and said base plate being constructed and arranged to be manually fixed from further movement after said belt tensioning pulley is moved into said predetermined static tensioning relation with said belt, and wherein said tensioner is rendered operative after said base plate is fixed from further movement by unattaching said pivoted structure from said base plate to enable pivotal movement of said pivoted structure with respect to said eccentric adjusting member.

4. A belt tensioner according to claim 3, comprising a removable pin which temporarily attaches said pivoted structure to said base plate, and wherein removal of said pin unattaches said pivoted structure from said base plate to enable said pivotal movement of said pivoted structure with respect to said eccentric adjusting member.

5. A belt tensioner according to claim 3, comprising a latch member pivotally attached to said base plate and which temporarily attaches said pivoted structure to said base plate, and wherein manual pivoted movement of said latch member unattaches said pivoted structure from said base plate to enable said pivoted movement of said pivoted structure with respect to said eccentric adjusting member.

6. A belt tensioner for tensioning a drive belt or timing belt, comprising:

a base plate constructed and arranged to mount said belt tensioner on an engine frame:

an adjusting member mounted on said base plate;

a pivoted structure mounted for pivoted movement with respect to said adjusting member between a first position and a second position, said pivoted structure having first and second stop surfaces providing limits to said movement thereof;

said base plate constructed and arranged to engage said first and second stop surfaces to thereby limit movement of said pivoted structure between said first and second positions thereof during operation of said tensioner;

a belt tensioning pulley mounted for rotational movement on said pivoted structure; and a coil torsion spring having one end thereof operatively connected with said pivoted structure and being constructed and arranged to resiliently bias said pivoted structure during operation of said belt tensioner in a belt tightening direction away from said first position and toward said second position, said torsion spring having a radially outwardly extending second end bearing against a spring engagement portion of an engine frame on which said belt tensioner is mounted;

said adjusting member being adjustable during an installation procedure to move said pivoted structure against the bias of said coil torsion spring, so that said belt tensioning pulley is moved into an installation position at which point said adjusting member is to be fixed;

wherein adjustment of said adjusting member during said installation procedure causes said second end of said torsion spring to be disposed in sliding contact relation to the spring engagement portion of the engine frame on which the belt tensioner is mounted.

7. A belt tensioner according to claim 6, wherein said mounting surface for said engine frame is disposed directly on said engine frame itself, with no intervening structure.

8. A belt tensioner according to claim 6, wherein said mounting surface is provided as a separate member fixed to the engine frame.

9. A belt tensioner according to claim 6, further comprising a bearing disposed between said pivoted structure and said eccentric adjusting member, and wherein said pivoted structure pivots on said bearing during operation of said belt tensioner to maintain substantially constant tension in said belt.

10. A belt tensioner according to claim 6, wherein said spring engagement surface comprises a slot formed in the engine frame itself, and wherein said area of said second end portion of said spring is received within said slot.

11. A belt tensioner according to claim 6, wherein said spring engagement surface comprises a projecting pin, and wherein said area of said second end portion of said spring engages said pin.

12. A belt tensioner according to clam 6, wherein said belt tensioning pulley is disposed in predetermined static tensioning relation with said belt when said pivoted structure is moved to said predetermined installation position.

13. A belt tensioner according to claim 6, wherein said second end portion of said coil torsion spring is disposed approximately mid-way between said first and second stop surfaces of said pivoted structure when said pivoted structure is moved to said predetermined installation position.

14. A belt tensioner according to claim 6, wherein said pivoted structure including said stop surfaces thereof comprises a one-piece, integrally formed member.

15. A belt tensioner according to claim 6, wherein radially outwardly extending second end portion extends radially outwardly beyond a radially outer extent of said belt tensioning pulley.

16. A belt tensioner for tensioning a drive belt or timing belt comprising:

- an eccentric adjusting member constructed and arranged to be mounted on a mounting surface for an engine frame;
- a pivoted structure mounted for pivoted movement with respect to said adjusting member between a first position and a second position, said pivoted structure having first and second stop surfaces providing limits to said movement thereof;
- a belt tensioning pulley mounted for rotational movement on said pivoted structure; and
- a coil torsion spring having one end portion thereof operatively connected with said pivoted structure and being constructed and arranged to resiliently bias said pivoted structure during operation of said belt tensioner in a belt tightening direction away from said first position and toward said second position, said torsion spring having a radially outwardly extending second end portion including an area thereof bearing against said engine frame mounting surface so as to be fixed from rotation;
- said eccentric adjusting member being adjustable during an installation procedure to move said pivoted structure against the bias of said coil torsion spring into a predetermined installation position, at which point said eccentric adjusting member is to be fixed;
- wherein during operation of said tensioner, movement of said pivoted structure in a direction toward said first position is terminated at said first position by engagement of said first stop surface with said radially outwardly extending second end portion of said coil torsion spring, and wherein movement of said pivoted structure in a direction toward said second position is terminated at said second position by engagement of said second stop surface with said radially outwardly extending second end portion of said coil torsion spring.

* * * * *